United States Patent

[11] 3,577,807

| [72] | Inventors | Robert H. Alexander;<br>Ronald C. Falter; Cecil D. Ringer,<br>Columbia, S.C.; Eugene Linsker, Dayton,<br>Ohio |
|---|---|---|
| [21] | Appl. No. | 772,132 |
| [22] | Filed | Oct. 31, 1968 |
| [45] | Patented | May 4, 1971 |
| [73] | Assignee | Rockwell Manufacturing Company<br>Columbia, S.C. |

[54] PORTABLE POWER TOOL
22 Claims, 9 Drawing Figs.

[52] U.S. Cl................................................ 408/17,
77/32.7, 77/32.8, 77/32.5, 77/34.4, 77/34.5
[51] Int. Cl........................................................ B23b 45/14
[50] Field of Search......................................... 77/13, 32.4,
32.5, 32.7, 32.8, 33.1, 34.4, 34.5, 34.7

[56] References Cited
UNITED STATES PATENTS
3,487,729  1/1970  Juhasz et al.................. 77/32.5X 3,411,385  11/1968  Quackenbush.............. 77/32
2,893,276  7/1959  Quackenbush.............. 77/34
2,893,272  7/1959  Linsker....................... 77/32

*Primary Examiner*—Francis S. Husar
*Attorney*—Marechal, Biebel, French and Bugg ABSTRACT: A portable tool incorporates an air motor which drives a tubular drive shaft splined to a spindle movable axially in a direction parallel to the axis of the motor. The spindle has a hollow rearward end portion with internal threads which receive screw members mounted on a tubular feed shaft also driven by the motor through an adjustable detent clutch. An adjustable stop collar surrounds the spindle and provides precise depth control, an air cylinder provides rapid advancement of the spindle, and the clutch provides automatic disengagement of the positive feed as well as limited rotation of the spindle at the forward end of the feed stroke before the spindle retracts. The controls for adjusting the stop collar and for effecting positive feed and rapid advancement and retraction of the spindle are located at the rear of the tool.

Patented May 4, 1971
3,577,807
2 Sheets-Sheet 1
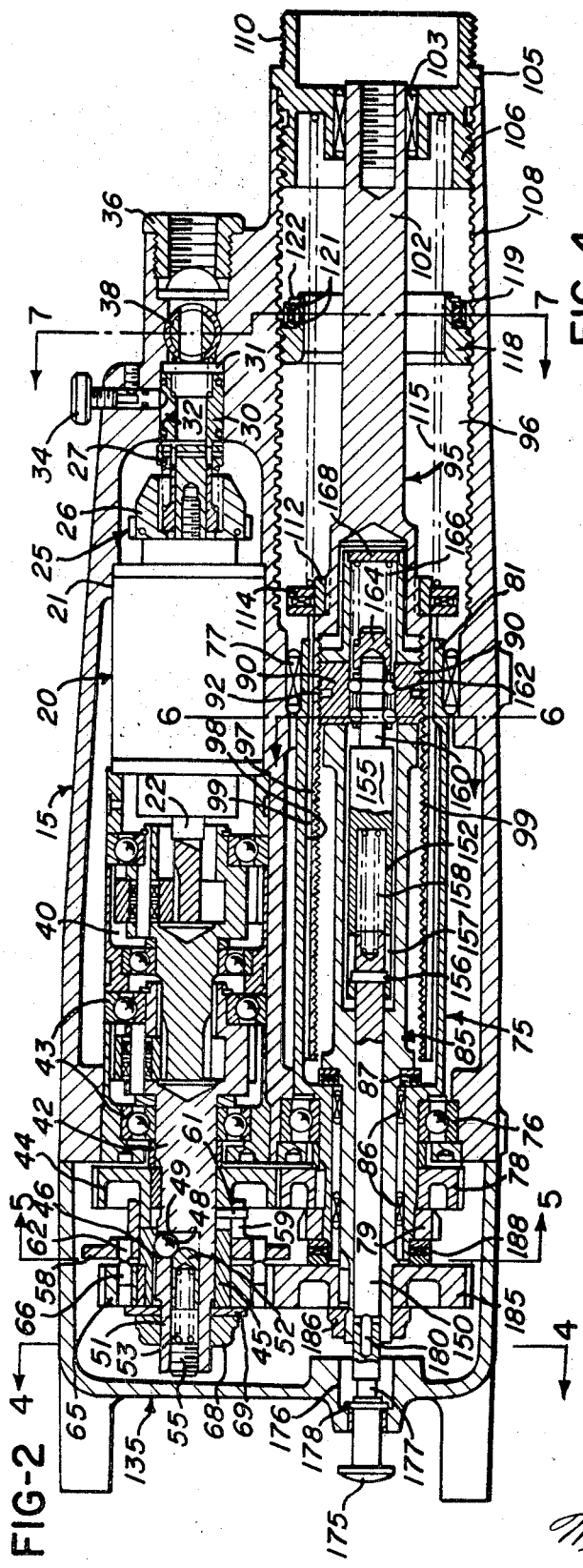
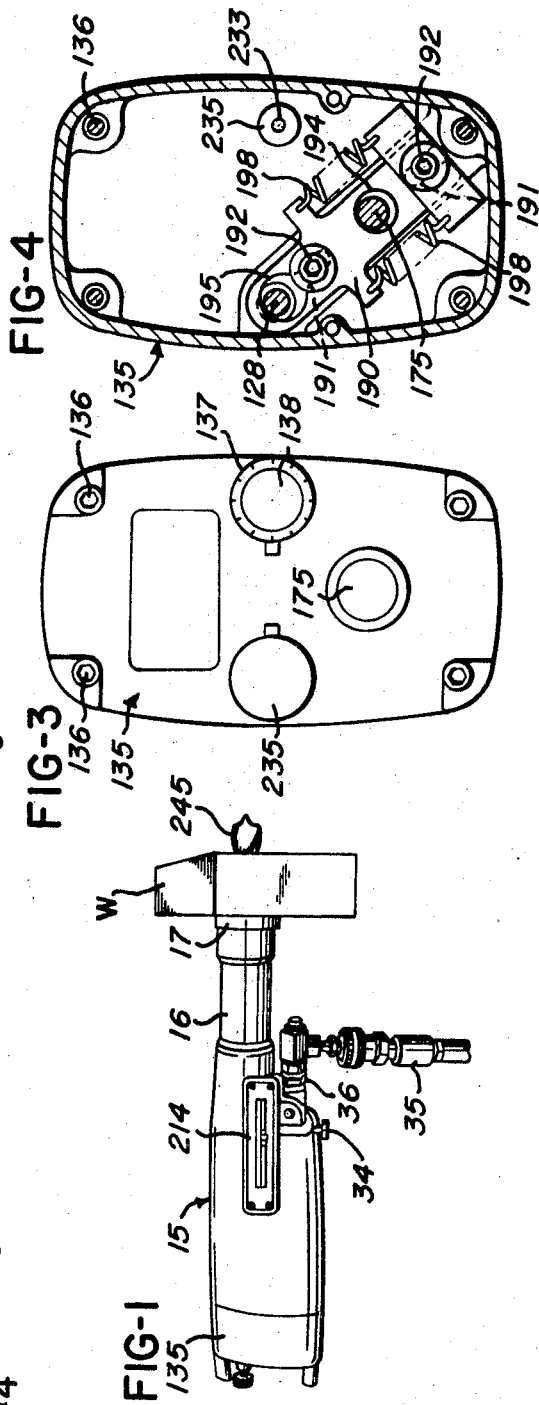
INVENTORS
ROBERT H. ALEXANDER,
RONALD C. FALTER,
CECIL D. RINGER &
EUGENE LINSKER
BY Marechal, Biebel, French & Bugg
ATTORNEYS Patented May 4, 1971 3,577,807
2 Sheets-Sheet 2
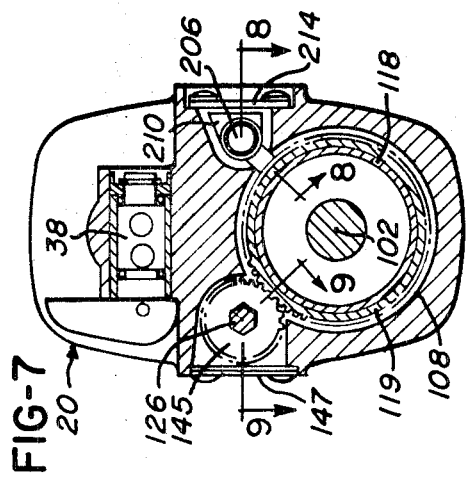
FIG-7
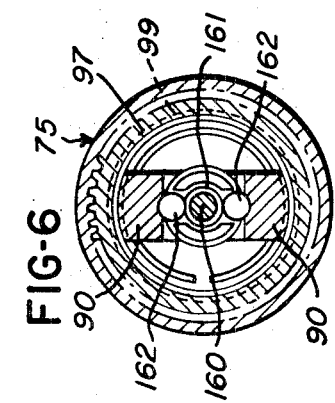
FIG-6
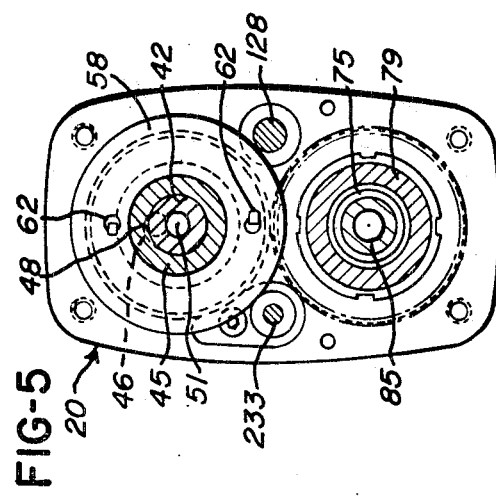
FIG-5
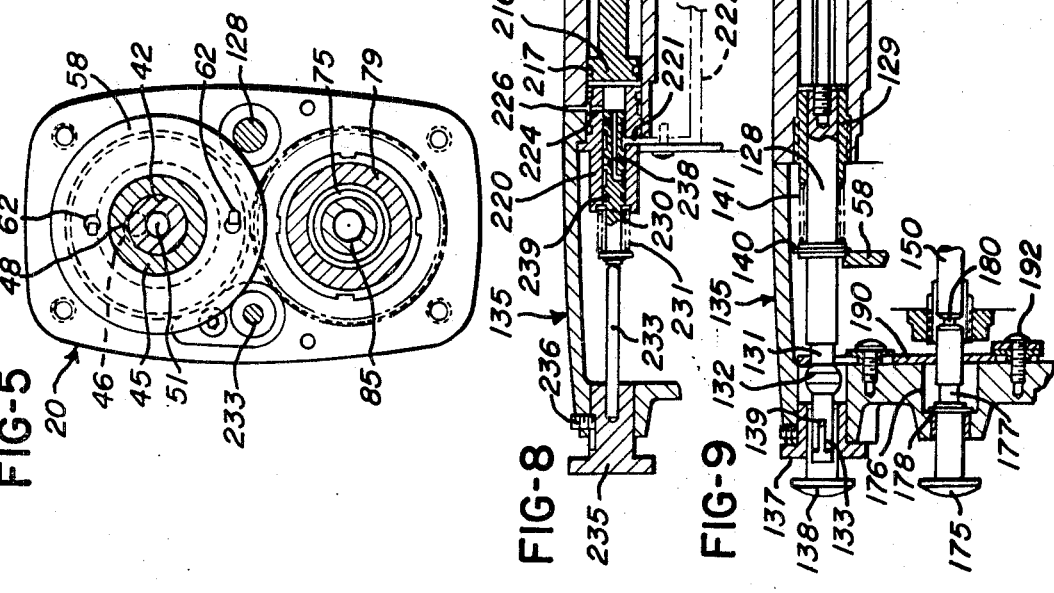
FIG-8
FIG-9

3,577,807

PORTABLE POWER TOOL

BACKGROUND OF THE INVENTION

In a portable power tool such as disclosed in Pat. No. 2,893,272 which issued to the assignee of this invention, it is frequently desirable to provide a positive feed of the rotatable spindle as well as an adjustable depth control for precisely limiting the feed stroke of the spindle. Furthermore, it is desirable to provide for rotation of the spindle after it reaches the end of the feed stroke to assure "cleanup" of a drilling, countersinking, spot facing or other machining operation.

For drilling a deep hole in some materials, it is desirable to employ a "woodpecking" operation whereby the drill is positively fed a selected distance and is then retracted to remove chips from the hole after which the drill bit is advanced back into the hole to continue the drilling operation. To obtain efficiency in a "woodpecking" operation, preferably the power tool incorporates means for rapidly retracting and advancing the spindle to minimize the nonmachining time when chips are being cleaned from the hole. Moreover, it is desirable to provide all of these features in a compact tool employing mechanism which is relatively economical and simple in construction and dependable in operation.

SUMMARY OF THE INVENTION

The present invention is directed to an improved compact portable power tool which provides all of the above features and, in addition, provides an infinitely variable speed control, thrust overload protection and push button controls which are located at the rear of the tool. Furthermore, the tool of the invention provides for automatic release of the positive feed of the spindle at the precise forward end of the feed stroke.

In accordance with a preferred embodiment of the invention, a portable power tool includes a housing which supports a spindle for both rotary and axial movement. The spindle includes a hollow rearward end portion with an external spline for slidably engaging a tubular drive shaft supported for rotation in axial alignment with the spindle. Internal threads are formed within the hollow rearward end portion of the spindle and are selectively engaged by screw members carried by a tubular feed shaft which receives a control rod for actuating the screw members.

The hollow drive shaft is driven by an air motor through a set of interchangeable gears, and the tubular feed shaft is driven by the motor through another set of interchangeable gears and an adjustable detent clutch. An axially adjustable collar surrounds the forward portion of the spindle and provides a positive stop for the spindle feed stroke, and an air cylinder has a piston rod which advances to effect rapid advancement of the spindle. Pushbutton controls are located at the rear of the tool for actuating the positive feed and rapid advancement and retraction of the spindle, and a control knob, located at the rear of the housing, provides for axially positioning the stop collar.

BRIEF DESCRIPTION OF THE DRAWINGS

FIG. 1 shows a portable power tool constructed in accordance with the invention;
FIG. 2 is an axial section of the tool shown in FIG. 1;
FIG. 3 is an end view of the tool shown in FIG. 1;
FIG. 4 is a section taken generally on the line 4—4 of FIG. 2;
FIG. 5 is a section taken generally on the line 5—5 of FIG. 2;
FIG. 6 is a section taken generally on the line 6—6 of FIG. 2;
FIG. 7 is a section taken generally on the line 7—7 of FIG. 2;
FIG. 8 is a section taken generally on the line 8—8 of FIG. 7; and
FIG. 9 is a section taken generally on the line 9—9 of FIG. 7.

DESCRIPTION OF THE PREFERRED EMBODIMENT

The portable power tool shown in the drawings includes a housing 15 which is rigidly connected to a support tube 16 releasably secured to a fixture 17 mounted on a workpiece W.

An air motor 20 of the sliding vane-type is mounted within a cylindrical bore 21 formed within the housing 15 and includes a drive shaft 22. A governor 25 includes a plurality of weight members 26 which rotate with the shaft 22 and actuate a spring biased sleeve 27 slidably mounted on the shaft 22. The forward end of the sleeve 27 cooperates with the rearward end of a flow control tube 30 which is slidably mounted within a bore 31 and includes a tapered hole 32 for receiving the tapered end of a screw 34. Air is supplied to the tool from a line 35 (FIG. 1) which is connected to a fitting 36 (FIGS. 1 and 2) threaded into the housing 15 adjacent a main shutoff valve 38 (FIGS. 2 and 7). The flow of air to the motor 20 can be variably controlled by adjusting the position of the screw 34 which regulates the axial position of the flow control tube 30 in relation to the governor sleeve 27.

The rearward end portion of the drive shaft 22 is connected by a planetary gear reduction system 40 to drive a shaft 42 supported by bearings 43 and keyed to a main drive gear 44. A sleeve 45 (FIGS. 2 and 5) is mounted on the shaft 42 and has an arcuate recess 46 which receives a ball 48 located within a radially extending hole 49 formed within the shaft 42. An axially extending hole 51 is formed within the rearward end portion of the shaft 42 and receives a plunger 52 which is held in engagement with the ball 48 by a compression spring 53 retained by an adjustable set screw 55 threaded into the rearward end portion of the hole 51. Thus the ball 48 and the recess 46 forms a detentlike clutch.

A circular actuator plate 58 (FIGS. 2 and 5) is slidably mounted on the sleeve 45 and has an axially extending slot 59 within its hub portion for receiving a pin 61 projecting radially outwardly from the interfitting hub of the drive gear 44. A pair of diametrically opposed tapered cam lugs 62 (FIG. 5) project rearwardly from the plate 58 and are located at different radii from the axis of the shaft 42. A spur gear 65 is mounted on the sleeve 45 and has a pair of diametrically opposed tapered cam lugs 66 which project rearwardly for engaging the corresponding lugs 62. The assembly of the gear 44, sleeve 45, plate 58 and gear 65 are retained on the shaft 42 by a nut 68 and washer 69.

A tubular drive shaft 75 is rotatably supported within the housing 15 by a ball bearing 76 and a needle bearing 77, and a gear 78 is mounted on the rearward end portion of the shaft 75 in mesh with the drive gear 44 on the shaft 42. The gear 78 is retained by a nut 79 threaded on the rearward end portion of the shaft 75, and an internal spline 81 forms the forward end portion of the shaft 75. A tubular feed shaft 85 is supported within the shaft 75 by a pair of needle bearings 86 and a thrust bearing 87. A pair of diametrically spaced screw members 90 are slidably retained within slots formed within the forward end portion of the shaft 85 and are urged inwardly by a retaining ring 92.

A spindle 95 is positioned within a bore 96 formed within the housing 15 and includes a hollow or tubular rearward portion 97 which is located between the shafts 75 and 85. A spline 98 is formed on the external surface of the spindle portion 97 for engagement with the spline 81 on the shaft 75, and internal threads 99 are formed on the spindle portion 97 for engagement by the screw members 90. The spindle 95 also includes a cylindrical forward portion 102 which is supported by a needle bearing 103 retained within a coupling member 105 having a portion 106 with external threads for engaging the internal threads 108 defining the bore 96. The coupling member 105 also includes an externally threaded portion 110 for attaching the tubular support member 16. (FIG. 1).

A sleeve 112 (FIG. 2) is threaded onto the central portion of the spindle 95 and supports an antifriction thrust bearing 114. A compression spring 115 has one end engaging the bearing 114 and an opposite end which seats on the coupling member 105. An annular stop member 118 surrounds the spindle portion 102 and spring 115 and includes external threads which engage the internal threads 108 formed within the bore 96. A ring-gear 119 is secured to the stop member 118 between a pair of washers 121 and is retained by a split ring 122. When the spindle 95 is advanced, the bearing 114 is adapted to engage the stop member 118 which is axially adjustable within the bore 96 for precisely controlling the forward limit of the feed stroke of the spindle 95 as will be explained later.

Referring to FIG. 9, an axially extending cylindrical hole 125 is formed within the housing 15, and a hexagonal shaft 126 extends through the hole 125. The rearward end of the shaft 126 is threaded into a control rod 128 slidably supported by bearing 129 inserted within the rearward end of the hole 125. The rearward end portion of the control rod 128 includes a circumferential groove 131, an annular tapered cam surface 132 and a slot 133.

A rearward end cap 135 is secured to the housing 15 by a plurality of screws 136 (FIG. 3), and a sleeve 137 is rotatably mounted within a hole formed within the cap 135. A manual retract button 138 includes a hole which receives the rearward end portion of the control rod 128, and a cross pin 139 extends through the slot 133 and aligned holes formed within the pushbutton 138 and the collar 137 so that rotation of the collar 137 causes rotation of the shaft 126. A collar 140 (FIG. 9) is mounted on the control rod 128, and a compression spring 141 extends between the bearing 129 and the collar 140 for urging the control rod 128 rearwardly against the cross pin 139.

A bearing 143 (FIG. 9) is mounted within the forward end of the housing 15 and supports the forward end portion of the shaft 126. A gear 145 is slidably mounted on the shaft 126 and is retained in alignment with the gear 119 on the stop member 118 by the pair of washers 121. Thus rotation of the sleeve 137 produces rotation of the stop member 118 within the threaded bore 96 and thereby moves the stop member 118 axially to adjust the forward limit of movement of the spindle 95. A transparent window 147 (FIGS. 7 and 9) is formed within the housing 15 to provide a visual indication of the position of the gear 145 and stop member 118.

Referring to FIG. 2, a control rod 150 extends axially within the tubular feed shaft 85 and has a forward end portion which projects into a bore 152 formed within a slightly larger rod 155. A cross pin 156 extends through the control rod 150 and projects into aligned slots 157 formed within the rod 155. A compression spring 158 extends within the hole 152 and urges the control rod 150 rearward until the cross pin 156 engages the rearward ends of the slots 157. The rod 155 includes a forward end portion 160 having a pair of axially spaced circumferential grooves 161 each of which receives a set of balls 162 projecting into races formed within the inner surfaces of the screw members 90. A stud 164 is mounted on the forward end of the rod portion 160 and locates a compression spring 166 which engages a plug 168 retained within the forward end of the tubular shaft 85.

A pushbutton 175 (FIG. 2) includes a stem which extends through a bearing supported within the rear wall of the cap 135 adjacent a counterbore 176, and a circumferential groove 177 is formed within the stem. A retaining ring 178 is mounted on the pushbutton 175 and engages the end of the counterbore 178. A hardened steel pivot pin 180 is mounted within the forward end portion of the pushbutton 175 and engages the rearward end of the control rod 150. Thus the compression springs 158 and 166 cooperate to urge the control rod 150 and pushbutton 175 rearwardly until the ring 178 engages the end of the counterbore 176. A gear 185 is keyed to the rearward end portion of the feed shaft 85 and meshes with the gear 65. The gear 185 is retained by a nut 186, and a thrust bearing 188 is located between the gear 185 and the nut 79 which retains the gear 78.

Referring to FIG. 4, an actuator plate 190 is located adjacent the rearward end wall of the housing cap 135 and includes a pair of slots 191 which receive retaining screws 192 threaded into the rear wall of the housing cap 135. The plate 190 has a hole 194 which receives the stem of the pushbutton 175 and also has a hole 195 which receives the control rod 128 (FIG. 9). A pair of tension springs 198 (FIG. 4) urge the plate 190 laterally so that when the pushbutton 175 is depressed, the plate 190 seats within the circumferential grooves 177 and 131 formed within the stem of the pushbutton 175 and the control rod 128, respectively.

Referring to FIG. 8, the portable power tool includes a mechanism for rapidly advancing the spindle 95. An axially extending cylindrical chamber 205 is formed within the housing 15 and receives a piston rod 206 slidably supported by a bearing 207. A dog 210 is mounted on the forward end portion of the piston rod 206 and is adapted to engage the rearward side of the thrust bearing 114 mounted on the spindle 95. The dog 210 slides adjacent a plate 214 secured to the housing 15. The piston rod 206 includes a head 216 which retains an O-ring seal 217.

A tubular fitting 220 is inserted within the rearward end portion of the chamber 205 and includes an inlet port 221 which is connected to an axially extending air supply passageway 222 formed within the housing 15 and connected to the main air supply adjacent the main valve 38. A discharge port 224 is formed within the fitting 220 and connects with an exhaust port 226 formed within the housing 15. A valve stem 230 is slidably mounted within the fitting 220 and a compression spring 231 urges the valve stem 230 rearwardly against a control rod 233 supported by a pushbutton 235 slidably mounted within the housing cap 135 and retained by a set screw 236. The valve stem 230 includes an L-shaped passageway 238 which connects the air inlet port 221 to the chamber 205 when the pushbutton 235 is depressed. When the pushbutton 235 is released, air pressure within the port 221 is cut off by the valve member 230 which retains a plurality of axially spaced O-ring seals 239 slidably engaging the fitting 220.

To illustrate the operation of the portable power tool, a drill bit 245 (FIG. 1) is secured to the forward end of the spindle 95 for drilling a hole through the workpiece W. To initiate the drilling operation, the pushbutton 175 is depressed causing the control rods 150 and 155 to shift forwardly and thereby expand the screw members 90 into engagement with the internal threads 99 formed within the rearward end portion 97 of the spindle 95. If the threads happen to be in crest-to-crest alignment, the control rod 150 momentarily telescopes within the rod 155 compressing the spring 158 which is somewhat stronger than the compression spring 166 so that pushbutton 175 can be depressed for engagement of latch plate 190 within groove 177 and damage to the threads is prevented.

As a result of the engagement of the screw members 90 with the internal threads formed within the spindle portion 96, the continuously rotating feed shaft 85 produces a positive forward advancement of the spindle 95 at a predetermined rate as determined by the differential rotational speed of the drive shaft 75 and the feed shaft 85. To change the positive feed rate, the cap 135 is removed and the gears 65 and 185 are interchanged with another set of gears which provide a different ratio. As mentioned above, when the pushbutton 175 is depressed, the plate 190 seats within the circumferential groove 177 within the stem of the pushbutton 175 thereby retaining the pushbutton 175 in a forward position.

If it is desirable to stop the positive feed of the spindle 95 at any time, the manual retract button 138 is depressed causing the cam surface 132 (FIG. 9) to shift the plate 190 laterally out of the groove 177 thereby permitting the control rods 150 and 155 to shift rearwardly under the force exerted by the spring 166 to release the engagement of the screw members 90 with the internal threads 99 on the spindle portion 97. The spring 115 then returns the spindle 95 to the position shown in FIG. 2. The manual retract button 138 is frequently used for retracting a drill bit when drilling a deep hole to clean the chips from the hole.

After the bit is retracted, it is quickly advanced back into the hole for continuing the drilling operation. To produce rapid advancement of the spindle, the pushbutton 235 is depressed which allows pressurized air within the passageway 222 to pressurize the chamber 205 behind the head 216 of the piston rod 206. As the piston rod 205 extends forwardly, the dog 210 engages the bearing 114 and quickly advances the spindle 95 until the drill bit engages the bottom of the hole. The pushbutton 235 is then released, and the pushbutton 175 is again depressed to effect a continuation of the positive feed drilling operation.

When the bearing 114 (FIG. 2) engages the annular stop member 118, the torque resistance is produced on the gear 65 by the ball 48. When a predetermined torque is reached, the ball 48 is cammed inwardly against the resistance produced by the spring-loaded plunger 52. This permits the gear 185 to continue rotating with the spindle 95 and gear 78, and the differential rotation between the gear 65 and the actuator plate 58, which rotates with the drive gear 44, eventually causes the tapered cam lugs 66 on the gear 65 to engage the tapered cam lugs 62 on the actuator plate 58 so that the actuator plate 58 is cammed forwardly. As a result of the engagement of the actuator plate 58 with the collar 140 (FIG. 9), the control rod 128 is shifted forwardly thereby camming the actuator plate 190 laterally to release the control rod 150 as described above.

From the drawings and the above description, it becomes apparent that a portable power tool constructed in accordance with the invention provides several desirable features and advantages. For example, by driving the feed gear 65 through the detent provided by the ball 48 and recess 46, the positive feed of the spindle 95 is provided with a thrust overload protection. That is, if the positive feed thrust on the spindle 95 exceeds a predetermined value, gear 44 will rotate relative to gear 65 thereby effecting automatic disengagement of the feed. Furthermore, when bearing 114 engages the stop member 118, a predetermined axial thrust is produced on the spindle 95 before the positive feed disengages. The approximate 360° relative rotation between the gears 44 and 65 after the bearing 114 engages the stop member 118 provides for several revolutions of the spindle 95 after axial movement stops thereby assuring effective cleanup and precise depth control of the machining operation.

Another important feature is provided by the pneumatic rapid advance system for the spindle 95. That is, by depressing the pushbutton 235, the spindle 95 is quickly advanced by the air pressure behind the piston rod 206. By presetting the air flow through the valve stem 230, the axial force exerted on the spindle 95 is controlled to assure that the tool bit does not engage the workpiece with a substantial impact.

The axial adjustment of the stop member 118 by rotation of the collar 137 provides a convenient means at the rear of the housing cap 135 for precisely adjusting the forward limit of the spindle feed stroke. Furthermore, all of the operating controls are in the form of pushbuttons located at the rear of the housing cap 135 which provides for convenient control of the power tool. The portable power tool also has the feature of infinitely variable speed control. That is, adjustment of the thumb screw 34 provides infinite axial adjustment of the flow control tube 30 which cooperates with the forward end of the sleeve 27 to control the flow of air to the motor 20.

While the forms of apparatus herein described constitutes a preferred embodiment of the invention, it is to be understood that the invention is not limited to this precise form of apparatus, and that changes may be made therein without departing from the scope of the invention.

We claim:

1. A portable power tool, comprising a housing, a rotatable spindle disposed within said housing and including a hollow rearward end portion with internal threads, means supporting said spindle for axial movement relative to said housing, a tubular drive shaft rotatably supported within said housing in alignment with said spindle and including a forward end portion receiving said rearward end portion of said spindle, spline means connecting said forward end portion of said drive shaft with said rearward end portion of said spindle, a motor mounted on said housing and including a shaft, drive means connecting said motor shaft to said drive shaft for rotating said spindle, a tubular feed shaft rotatably supported within said drive shaft, expandable screw means mounted on said feed shaft for releasably engaging said threads within said spindle, drive means connecting said motor shaft to said feed shaft for rotating said feed shaft at a speed different from the speed of said drive shaft, a control rod extending axially through said feed shaft for actuating said screw means to effect positive forward feed of said spindle, in response to rotation of said feed shaft, and means for retracting said spindle.

2. A power tool as defined in claim 1 including a spring biased clutch within said drive means for rotating said feed shaft and being effective to provide rotation of said drive shaft and said feed shaft at the same speed when said spindle arrives at the end of its forward stroke to assure cleanup of a machining operation.

3. A power tool as defined in claim 2 including means actuated by said clutch for releasing said positive forward feed of said spindle in response to rotation of said drive shaft and said feed shaft at the same speed.

4. A power tool as defined in claim 1 including a pushbutton control located at the rear of said tool and connected to said control rod for initiating said positive forward feed of said spindle.

5. A power tool as defined in claim 1 wherein said motor comprises an air motor including a governor having an air flow control member movable in response to the speed of said motor, and adjustable flow control means supported by said housing and cooperating with said flow control member for infinitely varying the supply of air to said motor.

6. A power tool as defined in claim 1 including means defining a bore within the forward end of said housing for receiving said spindle and having internal threads, an annular collar positioned within said bore and having external threads for engaging said internal threads, means carried by said spindle for engaging said collar to effect a positive and precise stop of said forward feed of said spindle, and control means located adjacent the rearward end of said housing for rotating said collar within said bore to adjust the position of said stop.

7. A power tool as defined in claim 6 including means for actuating said control rod to release said positive feed in response to a predetermined axial thrust on said spindle after said means carried by said spindle engages said collar.

8. A power tool as defined in claim 6 wherein said means for rotating said collar include means forming external gear teeth on said collar, a spline rod extending within said housing parallel to said shafts, a gear slidably mounted on said spline rod and engaging said teeth on said collar, and means located adjacent the rearward end of said housing for rotating said spline rod to effect rotation of said collar.

9. A power tool as defined in claim 2 wherein said clutch includes a ball, means forming a detent for said ball, and adjustable spring means for urging said ball into said detent.

10. A power tool as defined in claim 9 wherein said clutch includes a feed gear and a clutch plate positioned in adjacent relation, spring means urging said plate towards said gear, tapered cam lugs on said gear and said plate for shifting said plate away from said gear in response to relative rotation between said gear and said plate, and means for actuating said control rod in response to shifting of said plate to provide for automatic termination of said positive feed and operation of said retracting means.

11. A power tool as defined in claim 1 including means defining an air chamber within said housing, a piston rod slidably mounted within said chamber, means connecting said piston rod to said spindle, and control means for introducing pressurized air into said chamber to effect movement of said piston rod and rapid advancement of said spindle.

12. A power tool as defined in claim 11 wherein said control means is actuated by a pushbutton control located adjacent the rearward end of said housing.

13. A power tool as defined in claim 1 wherein said means for retracting said spindle comprises a compression spring disposed within a bore within said housing and surrounding said spindle, and an annular collar adjustably mounted within said bore in surrounding relation within said spring to provide a precise stop to said positive forward feed of said spindle.

14. A power tool as defined in claim 1 including an actuator member positioned within said feed shaft for supporting said screw means, spring means urging said actuator member towards a position to provide normal disengagement of said screw means from said internal threads, said actuator member telescopically receiving said control rod, and spring means disposed between said control rod and said actuator member to provide relative movement therebetween to prevent damaging said internal threads if said control rod is actuated when said screw means and said internal threads are in crest-to-crest alignment.

15. A power tool as defined in claim 1 including control means for releasing said positive feed of said spindle at any point during its forward stroke, control means for actuating said control rod to initiate said forward feed, and each said control means including a pushbutton actuator located adjacent the rearward end of said housing.

16. A power tool as defined in claim 15 including an adjustable member for positively stopping the forward feed of said spindle, and control means located adjacent the rearward end of said housing for adjustably positioning said member.

17. A portable power tool comprising a housing, a rotatable spindle supported within said housing for axial movement, an air motor supported by said housing, drive means connected to said motor for rotating said spindle, drive means connected to said motor for positively feeding said spindle axially at a predetermined rate, means for retracting said spindle, means defining an air chamber within said housing in laterally offset relation to said spindle, a piston rod positioned within said chamber, control means for introducing pressurized air into said chamber, means forming an outwardly projecting peripheral surface on said spindle, and means connected to said piston rod for engaging said surface in response to actuation of said control means to effect rapid advancement of said spindle at a rate substantially faster than said predetermined rate.

18. A portable power tool comprising a housing, a rotatable spindle supported within said housing for axial movement, an air motor supported by said housing, drive means including a set of drive gears connected to said motor for rotating said spindle, drive means including a set of feed gears connected to said motor for positively feeding said spindle axially, means for retracting said spindle, at least one cam lug mounted on one of said feed gears, a clutch member positioned adjacent said one feed gear and rotatable with one of said drive gears, at least one cam lug mounted on said clutch member, spring bias detent means connecting said clutch member to the adjacent said feed gear, said detent means being releasable to provide for relative rotation between said clutch member and said one feed gear in response to a predetermined torque on said feed gear, and said lug on said feed gear being arranged to engage said lug on said clutch member in response to said relative rotation for shifting said clutch member away from said feed gear, and means responsive to shifting of said clutch member for automatically releasing said feeding means.

19. A portable power tool, comprising a housing, a rotatable spindle disposed within said housing and including a hollow rearward end portion with internal threads, means supporting said spindle for axial movement relative to said housing, a tubular drive shaft rotatably supported within said housing in alignment with said spindle and including a forward end portion receiving said rearward end portion of said spindle, spline means connecting said forward end portion of said drive shaft with said rearward end portion of said spindle, a motor mounted on said housing and including a shaft, drive means connecting said motor shaft to said drive shaft for rotating said spindle, a feed shaft rotatably supported within said drive shaft, expandable screw means mounted on said feed shaft for releasably engaging said threads within said spindle, drive means connecting said motor shaft to said feed shaft for rotating said feed shaft at a speed different from the speed of said drive shaft, control means for actuating said screw means to effect positive forward feed of said spindle in response to rotation of said feed shaft, means for retracting said spindle, and said latter drive means including a spring bias clutch effective to provide rotation of said drive shaft and said feed shaft at the same speed when said spindle arrives at the end of its forward stroke to assure cleanup of a machining operation.

20. A portable power tool comprising a housing, a rotatable spindle supported within said housing for axial movement, an air motor supported by said housing and including a governor having an air flow control member movable in response to the speed of said motor, drive means connected to said motor for rotating said spindle, drive means connected to said motor for positively feeding said spindle axially, means for retracting said spindle, means for rapidly advancing said spindle, means for interrupting said feeding of said spindle, and adjustable flow control means supported by said housing and cooperating with said flow control member for infinitely varying the supply of air to said motor.

21. A portable power tool comprising a housing including means defining a bore having internal threads within its forward end portion, a rotatable spindle supported within said housing and said bore for axial movement, a motor supported by said housing, drive means connected to said motor for rotating said spindle, drive means connected to said motor for positively feeding said spindle axially, means for retracting said spindle, means for rapidly advancing said spindle, an annular collar positioned within said bore and having external threads for engaging said internal threads, means carried by said spindle for engaging said collar to effect a positive and precise stop of said forward feed of said spindle, and control means located adjacent the rearward end of said housing for rotating said collar within said bore to adjust the position of said stop.

22. A portable power tool comprising a housing including means defining a bore, a rotatable spindle supported for axial movement within said housing and said bore, an air motor supported by said housing, drive means connected to said motor for rotating said spindle, drive means connected to said motor for positively feeding said spindle axially, means for retracting said spindle, a compression spring disposed within a bore within said housing and surrounding said spindle, and an annular collar adjustably mounted within said bore in surrounding relation within said spring to provide a precise stop to said positive forward feed of said spindle.